Figure 1:
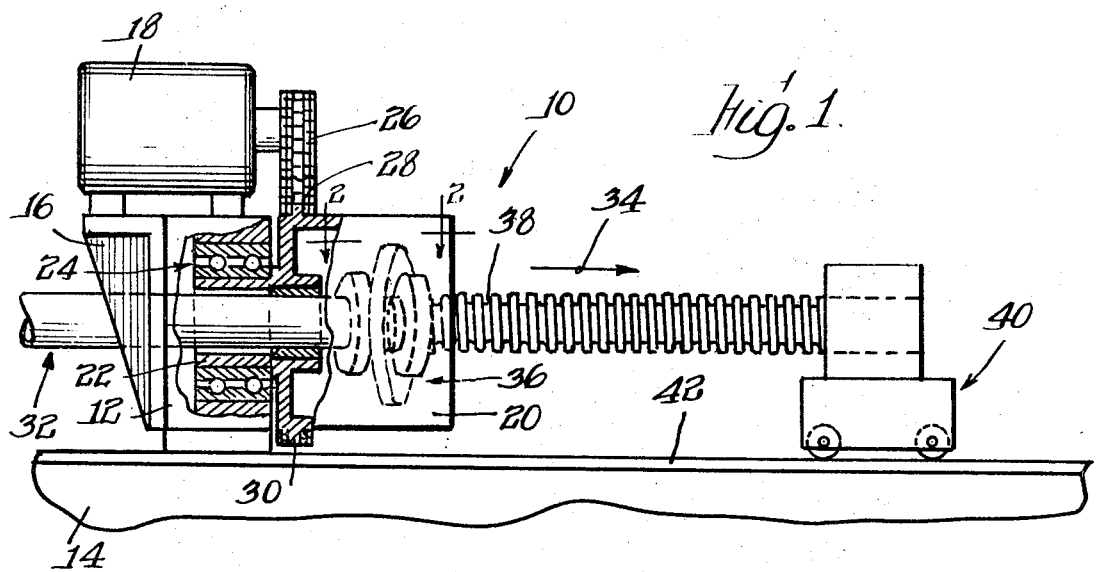

United States Patent

[11] 3,583,189

| [72] | Inventor | Donald G. Kelstrom<br>Elmhurst, Ill. |
|---|---|---|
| [21] | Appl. No. | 871,632 |
| [22] | Filed | Oct. 28, 1969 |
| [45] | Patented | June 8, 1971 |
| [73] | Assignee | Calumet & Hecla, Inc.<br>Evanston, Ill.<br>Continuation of application Ser. No.<br>677,493, Oct. 5, 1967, now abandoned. |

[54] TRIPLE DIE RING CORRUGATOR
11 Claims, 3 Drawing Figs.

| [52] | U.S. Cl. | 72/77 |
|---|---|---|
| [51] | Int. Cl. | B21d 13/02 |
| [50] | Field of Search | 72/77, 78, 95, 96, 98 |

[56] References Cited

UNITED STATES PATENTS

| 3,041,990 | 7/1962 | Le Fiell | 72/77 |
|---|---|---|---|
| 3,464,250 | 9/1969 | Stetka | 72/77 |

FOREIGN PATENTS

| 585,377 | 10/1959 | Canada | 72/77 |
|---|---|---|---|
| 28,765 | 6/1964 | Germany | 72/77 |

*Primary Examiner*—Richard J. Herbst
*Attorney*—Olsen, Trexler, Wolters & Bushnell ABSTRACT: Apparatus for helically corrugating metal tubing in which guides establish an axis of transit for a tubing to be corrugated and in which three die rings encircle the axis of transit relatively eccentric therewith for indentably engaging the tubing to generate a helical groove therein when relative rotation is imparted between the tubing and the die rings.

PATENTED JUN 8 1971

SHEET 1 OF 2

3,583,189

Inventor
Donald G. Kelstrom
By: Olson, Trexler, Wolters & Bushnell atty

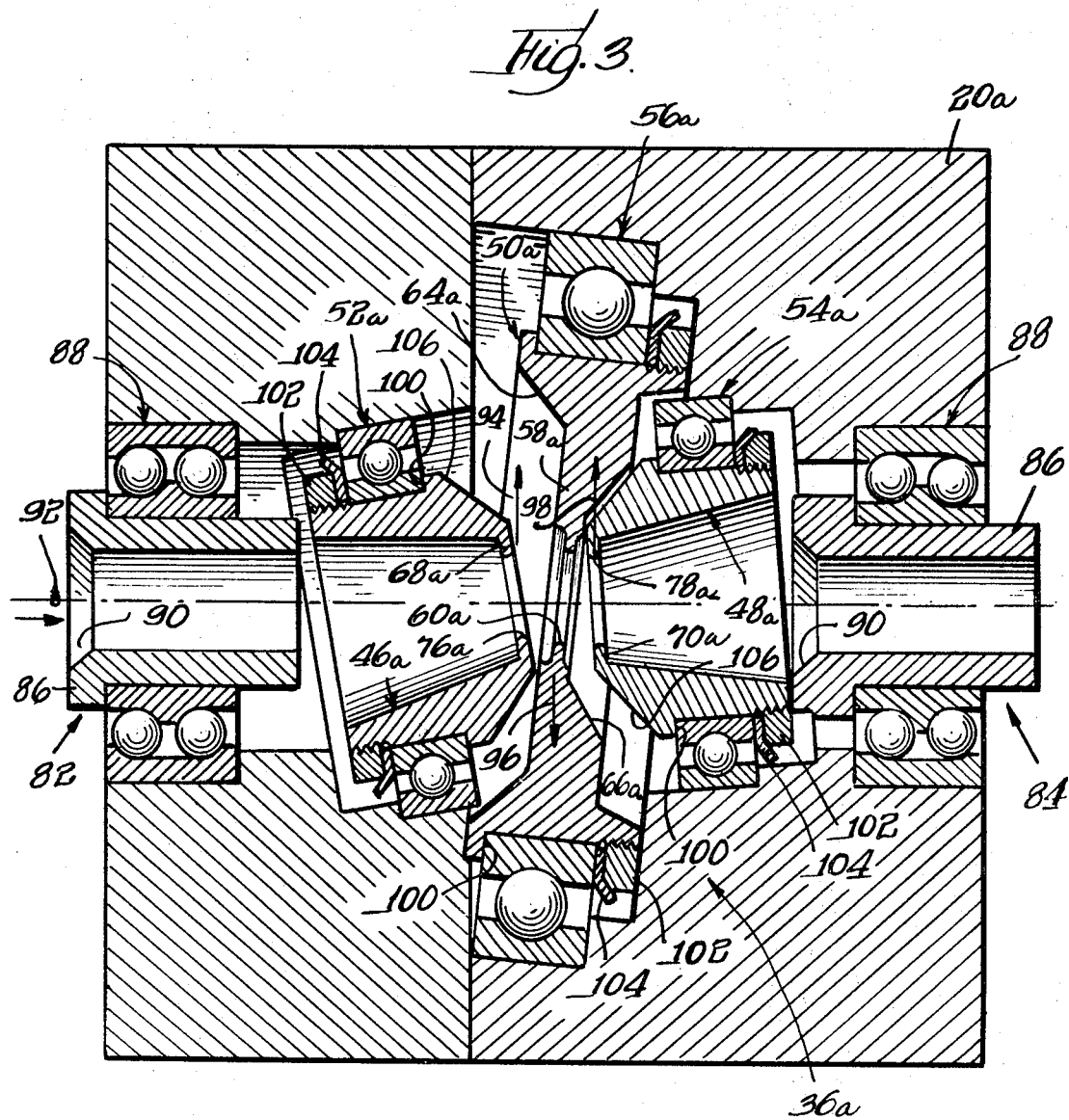

TRIPLE DIE RING CORRUGATOR

This application is a continuation of Ser. No. 677,493, filed Oct. 5, 1967, now abandoned.

This invention relates generally to machines for corrugating metal tubing.

Modern corrugated metal hose is commonly employed in such demanding uses as flexible conductors for the highly pressurized fueling fluids of aerospace vehicles; and such applications challenge the fabricators' art because the minutest wrinkling or scratching of the parent metal produces regions of weakness and potential rupture. In the case of the described fuel carriers, there is the concomitant danger of failure of the associated engine and possibly the entire mission. An important object of the present invention is therefore to provide a further advancement in the art of producing quality corrugated metal hose.

In the past, metal tubing has been formed with encircling grooves and alternating ridges by means of externally disposed rollers or solid discs. However, the opposing curvatures of the tubing and of such tools have been found to thin the metal excessively at the root of the groove where the rollers or discs engage the tubing. Undesirable wrinkling of the parent metal also is known to occur when such tooling is utilized.

A single tube-encircling die ring and separate, cooperating supports for the tubing, such as tubular bushes or a mandrel inserted in the tubing, have also been employed; but this latter arrangement has proved to require slow processing speeds if galling and scratching of the tube is to be kept to a minimum. This arrangement is, in addition, restricted to the production of comparatively short lengths of the corrugated product when an internal mandrel is incorporated. A coacting pair of tube-encircling rings has heretofore been employed to considerable advantage; but a second pair of such rings, operating successively on the tubing, has frequently been required when an especially deep corrugation was called for in order to secure maximum flexiblity in the resultant hose.

A general object of this invention is, accordingly, to overcome the aforesaid limitations of the prior art and to provide new and improved apparatus for producing corrugated metal hose.

Another object of the invention is to provide highly compact apparatus for helically corrugating metal tubing.

Still another object of the invention is to provide apparatus which efficiently forms deep corrugations in metal tubing.

These and other objects and features of the invention will become apparent from a consideration of the following descriptions.

Figure 2:
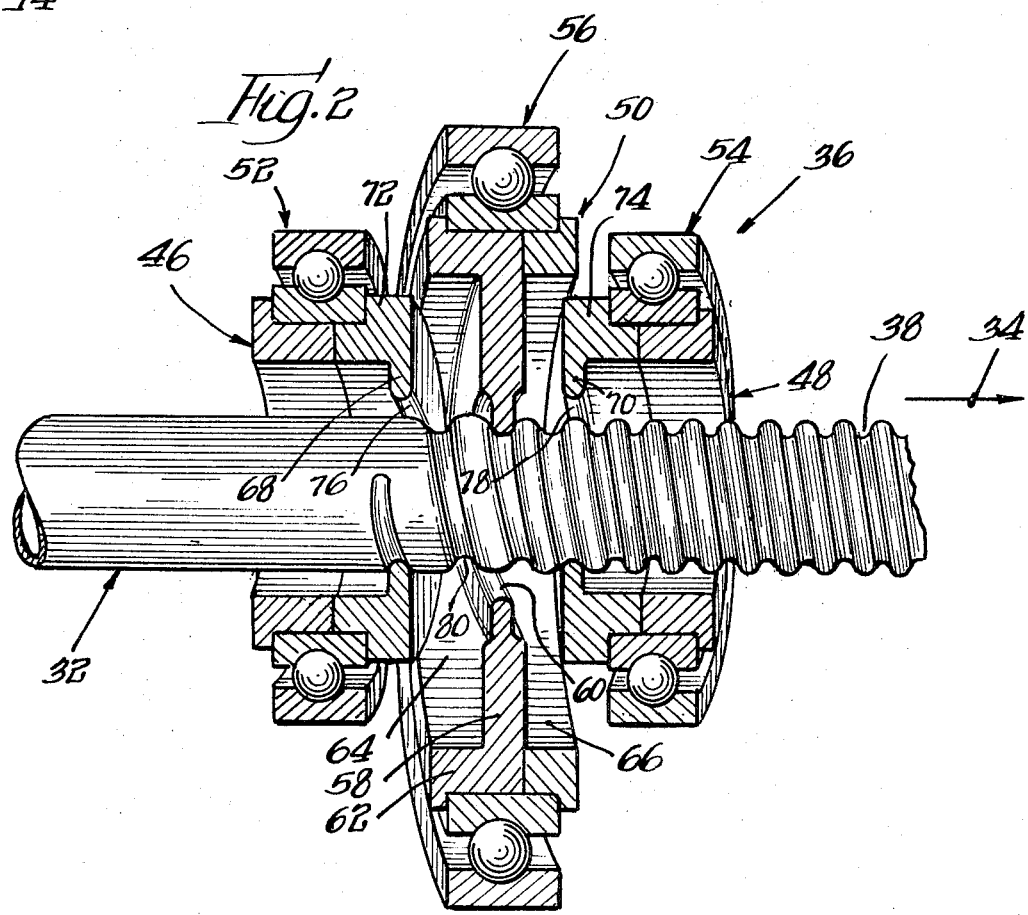

The invention, both as to its construction and its mode of operation, will be better understood by reference to the following disclosure and drawings forming a part thereof wherein:

FIG. 1 is a schematic, side elevational view of one form of apparatus embodying the present invention;

FIG. 2 is an enlarged, longitudinal sectional view taken in top plan substantially along the line 2-2 of FIG. 1, the carrier and tube guides being removed to facilitate showing the indentable engagement of the three die rings and the stages of forming a groove in the tubing; and FIG. 3 is a view similar to the showing of FIG. 2 but illustrating a modified embodiment of the tooling arrangement taken in side elevation to illustrate the relative inclination of the several die rings.

Referring now in detail to the drawings, specifically to FIG. 1, corrugating apparatus embodying the principles of the invention is indicated generally by the reference numeral 10; and the apparatus 10 includes a machinery base 12 which is secured to a factory floor 14 or other work surface. A bracket 16 is fastened to the machinery base 12 to cooperate with the base 12 in supporting a suitably energized motor 18. The motor 18 itself comprises a part of motive or drive means for a tool carrier 20 that is horizontally rotatably mounted to the machinery base 12 by means of a tubular shaft 22 and an antifriction bearing arrangement 24 of the ball or roller bearing type. In order to transmit rotary energy to the tool carrier 20, a drive pulley 26 is secured to the output shaft of motor 18; and pulley 26 is coupled to the carrier 20 by means of an endless drive belt 28 and a driven pulley 30 which is affixed to the tool carrier 20 in coaxial relationship.

The apparatus 10 is intended to form a helical corrugation in tubing fabricated from stainless steel or like material; and the bracket 16, the machinery base 12, the shaft 22, the driven pulley 30 and the tool carrier 20 are appropriately apertured to pass such a tube 32. As the tube 32 advances through the apparatus 10 in the general direction of arrow 34, a grooving tool arrangement 36, which will be described more fully hereinafter, works on the tubing to form a helical groove 38 therein. The leading end of the tube 32 is desirably supported, as for example on a truck 40 that rides on rails 42. A similar truck, not shown, may be provided at the trailing end of the tube and equipped with jaws to grip the uncorrugated portion of tube so as to prevent its rotation. The relative rotation between the grooving tool arrangement 36 and the tube 32 which is imparted by rotating the carrier 20 may also be achieved by rotating the tubing while holding the grooving tool arrangement relatively stationary, as by means of suitable drive means mounted on the truck 40.

Turning to a consideration of FIG. 2 for a description of the grooving tool arrangement 36, that assemblage is shown to comprise three cooperating, tube-encircling die rings or grooving tools, specifically an entrant ring 46, an exit ring 48 and a medial ring 50. These rings are freely rotatably mounted in the carrier 20 by means of antifriction bearings, respectively, ball bearings 52, 54 and 56. In the arrangement illustrated in FIG. 2, each of the die rings 46, 48 and 50 is comprised of two separate elements that are suitably joined together. However, the die rings may also be made up from a single piece of metal if desired. More importantly, the medial die ring 50 includes a thin annular web 58 which terminates, at its inner edge, in a hardened work or tool surface 60 which is appropriately contoured to cooperate in forming the shape and depth of groove desired in the tube 32. Radially outwardly of the web 58, the die ring 50 is provided with a support collar 62 which is fabricated in considerably greater thickness than the web 58 so as to impart strength to the die ring. The collar 62 is spaced generously apart from the work surface 60 and is shaped so as to define oppositely opening, cylindrical cavities 64 and 66, cavities 64 and 66 thereby being made capable of receiving the outboard rings 46 and 48 in partially nested relationship. It should be noted that the outside diameter of rings 46 and 48 is generally less than the inside diameter of collar 62 so as to further this interfitting or nested relationship.

The entrant ring 46 and the exit ring 48 are also fashioned with annular, radially inwardly extending webs, webs 68 and 70 respectively, these webs being disposed at the axially inner edges of collars 72 and 74 respectively. The webs 68 and 70 terminate at their radially inner edges in work or tool surfaces 76 and 78 respectively, and these work surfaces are shaped to cooperate in forming the desired depth and contour in the groove 38. The location of webs 68 and 70 of the outboard die rings in position generally confronting the web 58 of the medial die ring cooperates with the nested relationship of the several die rings in achieving a minimal axial or longitudinal spacing of the work surfaces 60, 76 and 78, thereby reducing the bending moment on the tube 32. This desirable configuration also permits the application of higher indenting pressure without damaging or distorting the tube 32 and thus produces a relatively deep groove in the tube 32.

The showing of FIG. 2 has been selected to illustrate the points of indentable engagement of the die rings 46, 48 and 50 on the tube 32. Specifically, it is important to observe that the die rings 46 and 48 engage the tubing diametrically opposite the point of engagement of the medial die ring 50 and longitudinally apart from that point by 1½ turns of the groove being formed. The spacing of the several die rings at successive arcuate spacings of 180° is particularly valuable since it permits the grooving tool arrangement 36 to achieve the equivalent of two standard operations at a single work station, a first forming operation being achieved by the cooperation of medial ring 50 and entrant ring 46 and a second forming operation being produced by the cooperation of medial ring 50 and exit ring 48. This is apparent from the showing of the drawing where an incomplete groove 80 is formed in tube 32 between rings 46 and 50 while the complete groove 38 is present in the tube 32 as it leaves the work surface 78 of exit ring 48. The points of indentable engagement of the three die rings may be arranged in other configurations such as, for example, a successive arcuate spacing of 120°. However, this latter configuration produces only the equivalent of one standard operation, or about half of the effect achieved by the 180° arcuate spacing.

It is also advantageous to arrange the inside diameter of the annular work surfaces 60, 76 and 78 to be of greater dimension than the outside diameter of the tube 32 in its uncorrugated state. So arranged, the die rings 46, 48 and 50 have a minimal area of contact with the tubing. Correspondingly, the several die rings engage the tube 32 with a minimal frictional force, thereby making it easier to form the groove in the tube and further resulting in a minimum tendency to twist or otherwise distort the tube. Mounting of the die rings 46, 48 and 50 in antifriction bearings permits the tools to roll about the tube 32, thus minimizing sliding friction and the resultant tendency to gall the tubing. This mounting of the die rings further facilitates forming of the groove and thereby promotes a rapid operation.

It is also advantageous to angulate the individual grooving tools relative to the longitudinal axis of the tube being corrugated; and in order to illustrate this inclination of the die rings, a modified embodiment of the invention is shown in FIG. 3. The arrangement of FIG. 3 embodies the important structural features and relationships of the arrangement of FIG. 2; and therefore, like numerals have been used to represent like parts, the suffix letter "a" being employed to distinguish the elements associated with the embodiment of FIG. 3.

The embodiment of FIG. 3 shows the tool carrier 20a used as a mounting for a pair of tube guides 82 and 84, as well as a mounting for the grooving tool arrangement 36a. More specifically, the tube guides 82 and 84 each comprises a tubular bushing 86 and an antifriction bearing 88 of the ball bearing type for freely rotatably mounting the bushing 86 in the carrier 20a. The tube guides 82 and 84 are spaced axially to admit the grooving tool arrangement therebetween; and for facility in feeding the tube to be corrugated, the bushings 86 are fashioned with throats 90 that are flared in the direction of tube entry which, for the sake of reference, will be called hereinafter the forward end of the carrier. The axes of bushings 86 are aligned to form an axis of transit 92 for the tube to be corrugated. In order that the die rings 46a, 48a and 50a may have the desired configuration of their points of indentable engagement with the tube to be corrugated, as described hereinabove, the centers of the respective work surfaces of the die rings are offset or made eccentric relative to the axis 92, the work surface of die ring 46a being radially offset in the direction of arrow 94, the work surface of die ring 50a being offset in the direction of arrow 96 and the work surface of die ring 48 being radially offset in the direction of arrow 98.

Considering the matter of inclination of the several die rings, it will be noted that the die ring 50a is inclined rearwardly whereas the die rings 46a and 48a are inclined oppositely, i.e. in a generally forward direction. In other words, the several die rings are disposed at respective angles relative to transverse planes intersecting the axis of transit 92 perpendicularly. In one useful embodiment of the invention, the entrant die ring 46a has been inclined forwardly at an angle of 10°, the exit die ring 48 has been inclined forwardly at an angle of 4°, and the medial die ring 50a has been inclined rearwardly at an angle of 6°.

The die rings 46a, 48a and 50a are characterized in their construction as unitary elements; and in order to mount the die rings to their respective antifriction bearings, the die rings are fashioned with an annular support shoulder 100 to oppose a threadedly assemblable lock ring 102. If desired, a washer 104 may be disposed between the lock ring 102 and the inner race of the antifriction bearing.

The grooving tool arrangement 36a is also characterized in that the cavities 64a and 66a of the medial die ring are of frustoconical, rather than cylindrical shape. Cooperatively, the axially inward, radially outward edges of the outboard die rings are relieved with conical tapers 106 to facilitate the nested relationship of the several die rings.

In use of the apparatus 10, whether it incorporates a grooving tool arrangement as is shown in FIG. 2 or one of the type exemplified by the showing of FIG. 3, rotation of the tooling carrier will impart an axial movement to the tube 32 in the general direction running from the forward to the rearward end of the carrier; and simultaneously, the helical groove 38 will be generated in the tube by the cooperative action of the three die rings. The specific action of the die rings will be apparent from the various descriptions which have been given hereinabove.

While particular embodiments of the invention have been shown, it should be understood, of course, that the invention is not limited thereto since many modifications may be made; and it is, therefore, contemplated to cover by the present application any such modifications as fall within the true spirit and scope of the appended claims.

I claim:

1. Apparatus for helically corrugating metal tubing comprising: guide means establishing an axis of transit for a tubing to be corrugated; a first freely rotatable die ring encircling said axis and eccentric therewith in a first radial direction for indentably engaging said tubing; second and third freely rotatable die rings encircling said axis spaced closely adjacent said first die ring in close coupled relationship on opposite sides thereof forming entrant and exit rings disposed eccentrically relative to said axis in a second radial direction diametrically opposite said first radial direction and having radially inwardly extending annular working surfaces disposed adjacent the axially inner ends thereof for indentably engaging said tubing axially closely adjacent the indentable engagement by said first die ring in the said close coupled relationship therewith to reduce bending moments on the tube; carrier means mounting said first, second and third die rings in said relative eccentric and close coupled relationship; and drive means for rotating one of said tubing and said carrier means generally about said axis to impart axial movement to said tubing and generate a helical groove therein.

2. Apparatus according to claim 1 wherein said first die ring has axially opening cavities at its opposite sides for nestably receiving the tube engaging working surfaces of said second and third die rings in said closely spaced and close coupled relationship.

3. Apparatus according to claim 2 wherein the positions of indentable engagement of said second and third die rings are spaced longitudinally apart from the position of indentable engagement of said first die ring by 1½ turns of the groove to be formed in the tubing.

4. Apparatus according to claim 2 wherein said annular working surfaces have inside diameters of greater dimension than the outside diameter of the uncorrugated tubing.

5. Apparatus according to claim 1 wherein said die rings are disposed at respective angles relative to transverse planes intersecting said axis perpendicularly.

6. Apparatus according to claim 5 wherein said second and third die rings are inclined oppositely of said first die ring.

7. Apparatus according to claim 1 wherein said guide means comprise a pair of tubular bushings freely rotatably mounted in said carrier means in axially spaced relationship to admit said die rings therebetween.

8. Apparatus for helically corrugating metal tubing comprising: guide means establishing an axis of transit for a tubing to be corrugated; a first freely intermediate rotatable die ring encircling said axis and eccentric therewith and having a radial web terminating in an annular working surface for indentably engaging said tubing and presenting cavities to each side of said web; second and third freely rotatable entrant and exit die rings encircling said axis and disposed at least partially within an adjacent cavity to be spaced closely axially adjacent said first die ring on opposite sides thereof and disposed eccentrically relative to said axis with radially inwardly extending annular working surfaces disposed adjacent the axially inner ends thereof for indentably engaging said tubing axially closely adjacent the indentable engagement by said first die ring to reduce bending moments on the tube; carrier means mounting said first, second and third die rings in said relative eccentric and close coupled relationship; and drive means for rotating one of said tubing and said carrier means generally about said axis to impart axial movement to said tubing and generate a helical groove therein.

9. Apparatus according to claim 8 wherein the entrant and exit die rings are inclined forwardly at approximate angles of 10° and 4°, respectively; and the intermediate die ring is inclined rearwardly at an angle of approximately 6°.

10. Apparatus according to claim 8 wherein the entrant die ring is inclined forwardly at a predetermined angle and the exit die ring inclined forwardly at a lesser angle; and wherein the intermediate die ring is inclined rearwardly at an angle between said predetermined and lesser angles.

11. Apparatus according to claim 8 wherein the axially inward outer edges of the second and third die rings are relieved with conical tapers to facilitate entry into a corresponding cavity for the nested relationship of the several die rings.

UNITED STATES PATENT OFFICE
CERTIFICATE OF CORRECTION

Patent No. 3,583,189               Dated June 8, 1971

Inventor(s) Donald G. Kelstrom

It is certified that error appears in the above-identified patent and that said Letters Patent are hereby corrected as shown below:

On the cover sheet, [73] Assignee "Calument & Hecla, Inc. Evanston, Ill." should read -- Universal Oil Products Company, Des Plaines, Ill., a corporation of Delaware --.

Signed and sealed this 22nd day of February 1972.

(SEAL)
Attest:

EDWARD M. FLETCHER, JR.            ROBERT GOTTSCHALK
Attesting Officer                   Commissioner of Patents